United States Patent [19]
Delavaux

[11] Patent Number: 6,043,929
[45] Date of Patent: Mar. 28, 2000

[54] ADIABATIC WAVEGUIDE AMPLIFIER

[75] Inventor: Jean-Marc Pierre Delavaux, Wescosville, Pa.

[73] Assignee: Lucent Technologies, Inc., Murray Hill, N.J.

[21] Appl. No.: 09/042,529

[22] Filed: Mar. 16, 1998

[51] Int. Cl.$^7$ .............................. H01S 3/091; H01S 3/16; G02B 6/12

[52] U.S. Cl. .............................. 359/337; 359/341; 385/29

[58] Field of Search ...................... 359/116, 176, 359/337, 341; 385/4, 27, 29, 43; 372/6, 19

[56] References Cited

U.S. PATENT DOCUMENTS

| | | | |
|---|---|---|---|
| 5,039,190 | 8/1991 | Blonder et al. | 359/341 |
| 5,119,450 | 6/1992 | Ranganath et al. | 385/14 |
| 5,227,913 | 7/1993 | McCaughan et al. | |
| 5,513,196 | 4/1996 | Bischel | 372/22 |
| 5,526,371 | 6/1996 | Shmulovich et al. | |
| 5,579,154 | 11/1996 | Fiedler et al. | 359/341 |
| 5,694,238 | 12/1997 | Lausen et al. | 359/341 |

OTHER PUBLICATIONS

Yumin et al, IEICE Trans. on Elect., vol. C77–c , #4., pp. 624–632 : abst. only herewith, Apr. 1994.

Vassallo, C., Optical and Quantum Elect., vol. 26, #3, pp. 235–248 : abst. only herewith, Mar. 1994.

Berdelli et al, IEEE J. Q. E., vol. 28, #2, pp. 447–458; abst. only herewith, Feb. 1992.

Hanna et al, "A side–pumped Nd:YAG epitaxial waveguide laser", Optics Communications, vol. 91, No. 3, 4, Jul. 1992, pp. 229 et seq.

Becker et al, "Er–diffused Ti:LiNbO$_3$ waveguide laser . . . ", Appl. Phys. Lett., vol. 61, No. 11, Sep. 1992, pp. 1257 et seq.

Nilsson et al, "Modeling and optimization of low–repetition.", Optics Letters, vol. 18, No. 24, Dec. 1993, pp. 2099 et seq.

Söchtig et al, "DBR waveguide laser in erbium–diffused . . . ", Elec. Lett., vol. 31, No. 7, Mar. 1995, pp. 551 et seq.

*Primary Examiner*—Nelson Moskowitz

[57] ABSTRACT

An optical waveguide amplifier is formed to include an adiabatic region disposed between an input single mode waveguide and a large area, multimode gain region. The utilization of the adiabatic region allows for a single mode signal to be supported and provides for a larger gain area to be formed, thus providing a larger gain and higher output power than conventional prior art waveguide amplifier arrangements.

10 Claims, 4 Drawing Sheets

ADIABATIC WAVEGUIDE AMPLIFIER

BACKGROUND OF THE INVENTION

1. Technical Field

The present invention relates to a waveguide amplifier and, more particularly, to a waveguide amplifier including adiabatic regions within the waveguide structure to improve the efficiency of the amplifier.

2. Description of the Prior Art

In the field of optical communications, it has become well-known to provide an optical amplifier by forming a rare-earth (i.e., erbium) doped waveguide within the surface of an optical substrate. An article entitled "Er-diffused Ti:LiNbO₃ waveguide laser of 1563 and 1576 nm emission wavelengths" by P. Becker et al. appearing in *Applied Physics Letters*, Vol., 61, No. 11, September 1992, describes one such exemplary structure. A conventional prior art Er-doped waveguide amplifier is illustrated in FIG. 1. Amplifier 10 comprises a doped waveguide 12 (such as, for example, a co-doped erbium and TiO₂) formed in the top surface 14 of an optical substrate 16 (such as, for example, lithium niobate). A first reflective surface 18 is formed along the entrance port of substrate 16 and a second reflective surface 20 is formed along the exit port of substrate 16. An optical source 22 provides a pump signal Pp, at a predetermined wavelength $\lambda_p$ that is coupled through first reflective surface 18 and into waveguide 12. Pump signal $P_p$ will thereafter propagate along the length L of waveguide 12 and be reflected back along waveguide 12 towards first reflective surface 18. Waveguide amplifier 10 may be used as either an amplifier, or a laser at an operating wavelength $\lambda_p$, which belongs to the emission spectrum of the stimulated rare earth ions. When used as a laser, the doping concentration within waveguide 12 needs to be relatively high (for example, several thousand parts epr million) in order to achieve the necessary gain over the length L of waveguide 12. A problem results in that the high doping level leads to ion cluster formation within waveguide 12, which in turn reduces the conversion efficiency ($\lambda_p \rightarrow \lambda_s$) of the amplifier/waveguide, yielding both lower gain and output power for the signal.

One alternative to maintain the inversion efficiency is to reduce the doping level within the waveguide and increase the length, L, of the waveguide structure. In order to use an optical substrate of conventional size, the increase in length may be achieved by using a "zig-zag", spiral, serpentine, or other appropriate pattern, across the substrate surface. However, while the waveguide length is increased, such a pattern necessarily increases the complexity of the device fabrication. Moreover, such a design has not been used successfully in the formation of a laser since the cavity increase also increases the number of modes (due to the decrease in free spectral range (FSR)).

Therefore, a need remains in the prior art for a waveguide design with improved gain-power efficiency.

SUMMARY OF THE INVENTION

The need remaining in the prior art is addressed by the present invention, which relates to a waveguide amplifier and, more particularly, to a waveguide amplifier comprising adiabatic regions within the waveguide structure to improve the efficiency of the amplifier.

In accordance with the teachings of the present invention, the waveguide structure comprises three separate types regions—a single mode region, a transition (adiabatic) region and a multimode region. One or more of the regions may be doped with a rare-earth ion. The input signal to be amplified is coupled to a single mode region and thereafter propagates through a coupled adiabatic region. Advantageously, the gradual outward expansion of the adiabatic region allows for the signal to physically expand while remaining single mode. The multimode region is disposed to couple to the expanded end of the adiabatic region. In one embodiment, the multimode region (being physically larger than prior art single mode waveguide amplifying regions) may comprise a lower doping concentration than prior art arrangements, thus reducing the ion cluster effect discussed above. Alternatively, the larger physical area of the multimode region may be doped at levels commensurate with arrangements of the prior art, thus providing additional gain and power for same dopant level. The multimode region is then followed by another adiabatic region which functions to transition the amplified signal into a small, single mode environment. Ultimately, a single mode waveguide is formed at the small end of the adiabatic region and is used as the output from the amplifier.

In an alternative embodiment, a second waveguide may be formed on the same substrate so as to intersect the adiabatic waveguide amplifier in the large area multimode region. The second waveguide may be used to launch, for example, a pump signal and the adiabatic waveguide used to propagate the information signal. Therefore, additional amplification will occur in the large area multimode region.

Various other waveguide arrangements, as discussed in detail below, may be used that incorporate the adiabatic teachings of the present invention.

BRIEF DESCRIPTION OF THE DRAWINGS

Referring now to the drawings, where like numerals represent like parts in several views.

DETAILED DESCRIPTION

Figure 2:
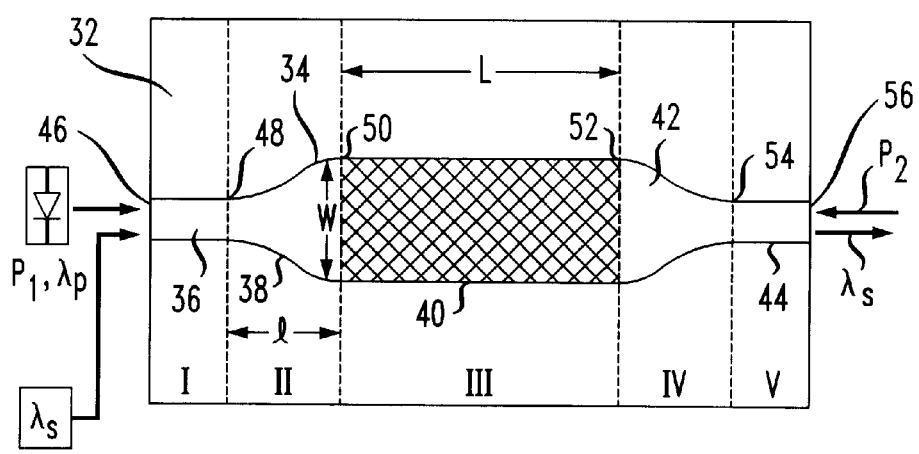
FIG. 2 illustrates an exemplary adiabatic waveguide amplifier formed in accordance with the present invention.

A basic adiabatic waveguide amplifier 30 formed in accordance with the present invention is illustrated in FIG. 2. Amplifier 30 is formed on a substrate of optical material 32, such as LiNbO₃ and comprises waveguide 34, where various techniques are known (see Becker, for example) for forming waveguides, including Er-doped waveguides, in optical substrate material. Thus, the formation process will not be discussed and is not considered relevant to the structural aspects of the present invention. Additionally, it is to be understood that the waveguide structure of the present invention could either be formed on the top surface of the substrate, or embedded within the substrate, both arrangements (and methods of forming such arrangements) being well-known in the art. Referring to FIG. 2, waveguide 34 comprises a first single mode region 36, a first adiabatic region 38, a large area multimode region 40, a second adiabatic region 42 and a second single mode region 44. The various regions transition smoothly from one to another such that there is no physical "break" in continuity. A pump signal $P_1$ and information signal S are both coupled through an input port 46 of amplifier 30, where input port 46 is defined as the endface of first single mode region 36. Signals $P_1$ and S thereafter propagate through first adiabatic region 38. Adiabatic region 38 is proportioned to maintain both signals as "single mode" as they propagate through. In particular, the input termination of first adiabatic region 38, denoted as 48 in FIG. 2 is essentially matched to first single mode region 36 to maintain the continuity in the single mode propagation. The width of first adiabatic region 38 thereafter gradually expands, as is well-known in the art, to allow for the waves to expand while remaining single mode. Therefore, at the output location of first adiabatic region 38, denoted as 50 in FIG. 2, pump signal $P_1$ and information signal S have expanded to encompass the larger region of the substrate, while maintaining their single mode character. In accordance with the teaching of the present invention, first single mode region 36 and first adiabatic region 38 may be doped or remain un-doped.

Figure 1:
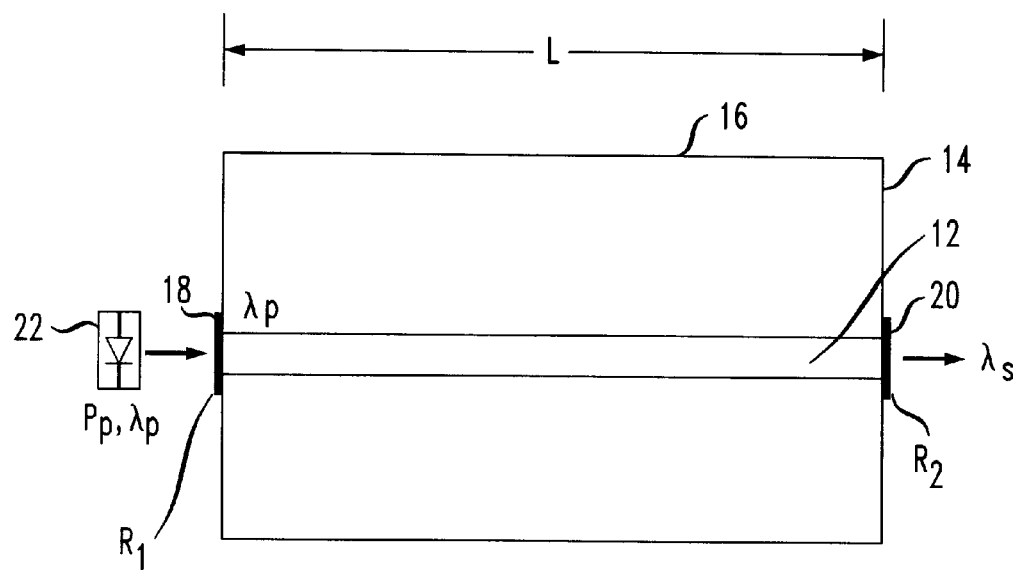
FIG. 1 illustrates a conventional prior art waveguide amplifier.

The greatest amount of amplification of information signal S occurs as pump signal $P_1$ and information signal S exit first adiabatic region 38 and enter large area multimode region 40. In accordance with the present invention, large area multimode region 40 is doped (as indicated by the shading in FIG. 2) to provide the necessary amplification of the information signal S. The doping concentration utilized within large area multimode region 40 is at the discretion of the user. In one embodiment, a relatively low doping concentration may be used (when compared with prior art doping levels) to avoid the prior art ion cluster problem. Since the area in which the gain will be occurring is so much larger than the prior art (such as shown in FIG. 1), at least the same level of gain may be achieved as with the prior art higher-doped configurations. Alternatively, a relatively high doping concentration may be used, thus achieving a gain and power increase heretofore unavailable with the constraints of the prior art arrangement. In general, any desired doping concentration may be used and is considered to fall within the spirit and scope of the present invention.

In order to provide a single mode amplified output signal, the amplified signal appearing at the endpoint 52 of large area multimode region 40 propagates through the second adiabatic region 42. As shown in FIG. 2, second adiabatic region 42 is formed to comprise a symmetrical geometry with first adiabatic region 38 such that the large expanse of the amplified signal is slowing transitioned down to the size of a conventional single mode waveguide. Therefore, endpoint 54 of second adiabatic region 54 is single mode and is matched to second single mode waveguide 44. Therefore, the amplified signal S will become single mode and propagate through second single mode waveguide 44 to the output port 56 of amplifier 30.

As is well-known in the field of doped-fiber optical amplification, the amplification process is not dependent on the propagation direction of the pump signal. That is, the pump signal may be co-propagating with the information signal, counter-propagating with respect to the information signal, or both a co- and counter-propagating pump signal may be used. The same concept applies to the arrangement of the present invention. In particular, with reference to FIG. 2, a second pump signal $P_2$ may be coupled into output port 56 of amplifier 30 and propagate through second single mode region 44 and second adiabatic region 42 into large area multimode gain region 40.

Figure 3:
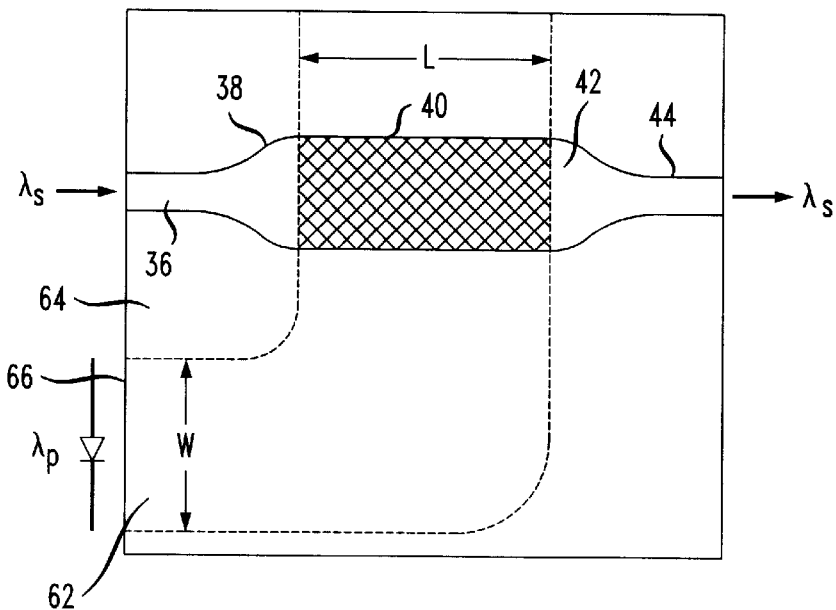
FIG. 3 is an alternative embodiment of an adiabatic waveguide amplifier of the present invention, including a second waveguide for side-pumping the large gain section.
Figure 4:
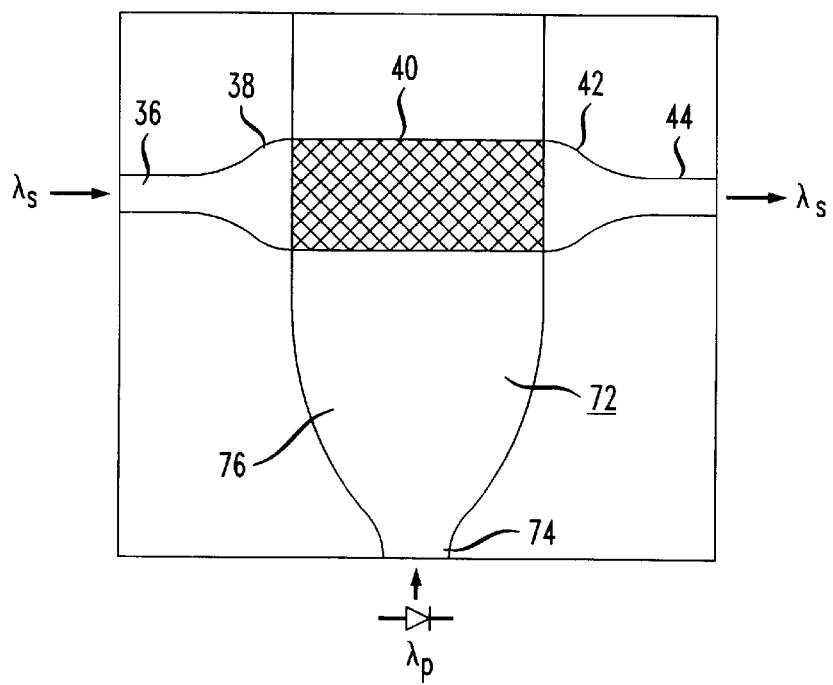
FIG. 4 illustrates another side-pumping arrangement of the adiabatic waveguide amplifier of the present invention.
Figure 5:
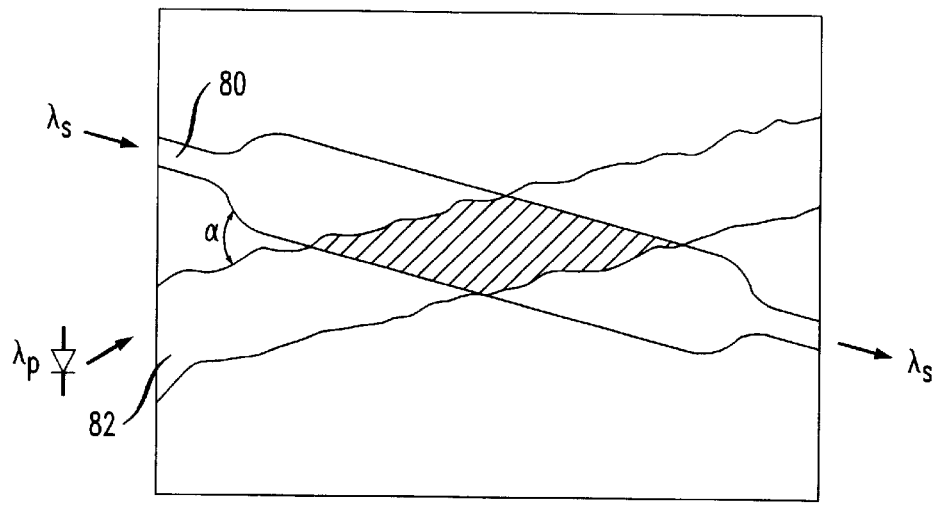
FIG. 5 is yet another adiabatic waveguide amplifier, the arrangement of FIG. 5 utilizing a serpentine design in the large gain multimode region to further increase the signal gain and power.

An alternative adiabatic waveguide amplifier 60 is illustrated in FIG. 3. In this arrangement, the singe mode regions, adiabatic regions and large area gain regions are similar to those illustrated in FIG. 2 and are identified with the same reference numerals. Amplifier 60 differs in that a separate waveguide 62 is used to support the pump signal and is disposed on optical substrate 64 so as to intersect with large area multimode region 40. In particular, as shown in FIG. 3, waveguide 62 is formed to comprise a width W essentially equal to the length L of the large area multimode gain region. In this arrangement, first and second single mode waveguide regions 36 and 44 need only be able to support the information signal wavelength $\lambda_s$. Waveguide 62 may be multimode and, in fact, a plurality of separate pump signal sources (an array, for example) may be simultaneously coupled along the endface 66 of waveguide 62, thereby increasing the pump power available for amplification of the information signal. FIG. 4 illustrates an alternative "side-pump" amplifier 70 where a second waveguide 72 is disposed orthogonal to the adiabatic waveguide amplifier. In this example, second waveguide 72 includes a single mode region 74 and an adiabatic region 76. Again, second waveguide 72 is used to couple the pump signal and allow the pump signal to increase in coverage so that the entire area of multimode region 40 will be subjected to the pump signal, providing a relatively high gain to the input information signal. An alternative side-pumping arrangement that is considered to minimize crosstalk by virtue of the angular displacement between the waveguides is illustrated in FIG. 5. In this arrangement, the adiabatic waveguide amplifier 80 is formed as a diagonal across the face of the optical substrate. A second waveguide 82, used to supply the pump signal is formed to intersect amplifier 80 at a predetermined angle a, sufficient to essentially eliminate crosstalk between the information signal and the pump signal.

Figure 6:
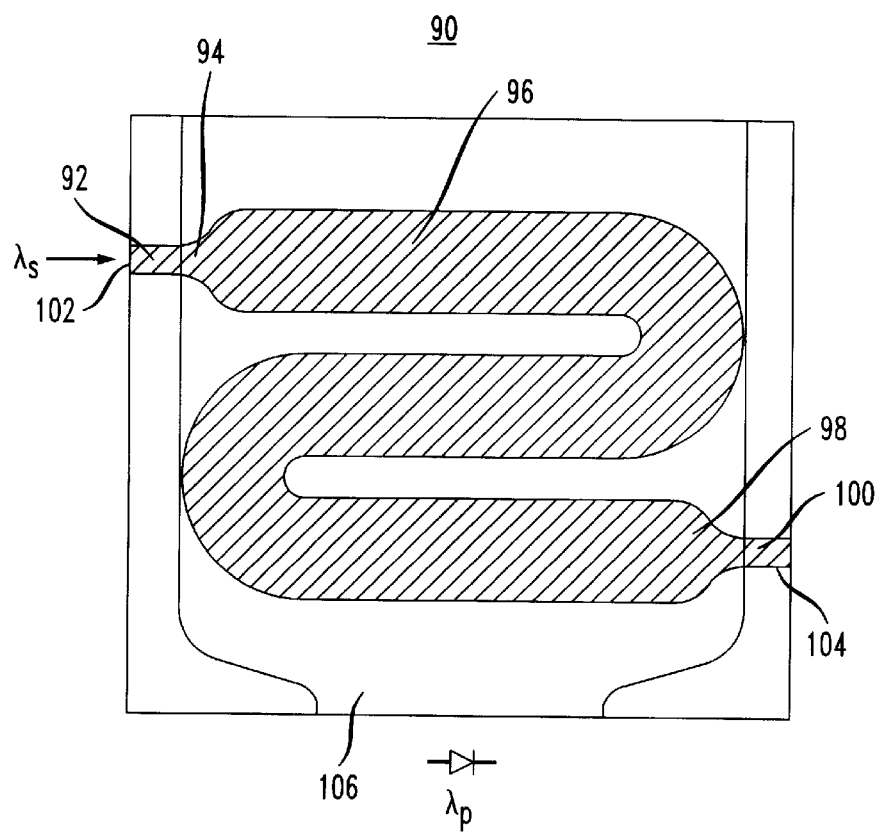
FIG. 6 illustrates a waveguide-based laser utilizing the adiabatic waveguide arrangement of the present invention in the gain region of the laser.

In order to achieve an even greater amplification of the information signal, the large area gain region may be disposed to cover a larger surface area of the optical substrate, similar to prior art attempts to increase gain. FIG. 6 illustrates a high gain amplifier 90 including a first single mode region 90, a first adiabatic region 94, a serpentine-patterned large area multimode gain region 96, a second adiabatic region 98 and a second single mode region 100. As with the arrangements discussed above, the input information signal S is coupled to first single mode region 90 at input port 102 and passes through the amplifier to exit at output port 104. A pump signal may also be coupled into the input (or output) port to achieve amplification within doped gain region 96. Alternatively, as shown in FIG. 6, a second waveguide 106 may be disposed orthogonal to the input and output ports and pump signal P applied as an input to this waveguide. In this case, amplification will occur throughout the entire shaded region as illustrated in FIG. 6.

Figure 7:
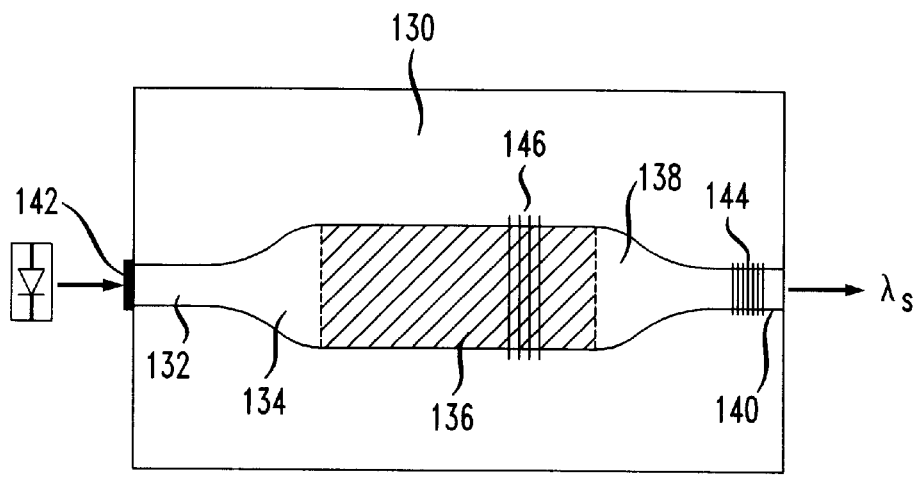
FIG. 7 is an alternative laser design, incorporating a Mach-Zehnder modulator with the adiabatic gain region.
Figure 8:
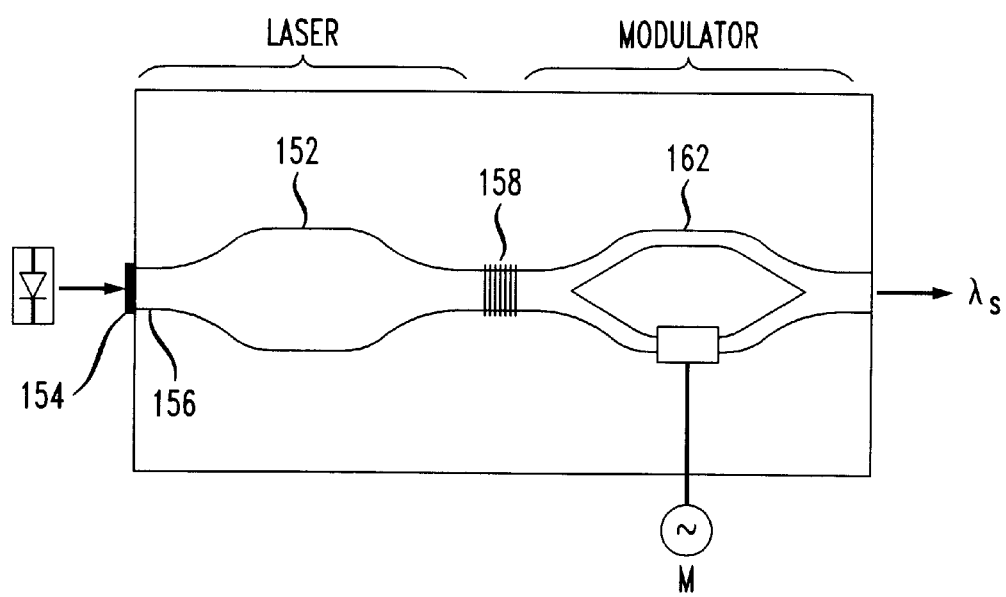
FIG. 8 illustrates a Q-switched laser utilizing an adiabatic waveguide as the gain section of the laser.

As mentioned above, the adiabatic waveguide amplifier design of the present invention may be used as the gain region for various laser structures. FIG. 7 illustrates an exemplary laser 120 comprising an adiabatic waveguide amplifier 130, amplifier 130 including a first single mode region 132, a first adiabatic region 134, a large area multimode gain region 136, a second adiabatic region 138 and a second single mode region 140. A reflecting surface is formed at the endface 142 of first single mode region 132 and a partially reflecting grating 144 is formed within second single mode region 140. An additional grating 146 may be incorporated with gain region 136 to further scatter the amplified spontaneous emission (ASE) beyond the lasing bandwidth of the waveguide. The ASE filtering would help to prevent gain saturation. An alternative laser arrangement 150 is illustrated in FIG. 8. In this configuration, an adiabatic waveguide amplifier 152 is formed as shown and includes a reflective mirror 154 disposed at input port 156 of the first single mode waveguide 158. The pump signal is coupled into input port 156. A grating 158 is written into a second single mode region 160 and is used as the input to a conventional Mach-Zehnder modulator 162. Modulator 162 is controlled by a separate signal M applied as input, as shown.

It is to be understood that the above-described embodiments are merely illustrative of the many possible specific embodiments that can be devised to represent application of the principles of the invention. Numerous and varied other arrangements can be devised in accordance with these principles by those skilled in the art without departing from the spirit and scope of the present invention.

What is claimed is:

1. An adiabatic optical waveguide amplifier comprising
   an optical substrate; and
   an optical waveguide including an input port and an output port formed within said substrate, said input port for receiving as separate inputs both an optical information signal and an optical pump signal, said optical waveguide including
   a first single mode region coupled to the input port for providing single mode propagation for both the information signal and the pump signal;
   a first adiabatic region formed to support the single mode information signal and single mode pump signal and coupled to a first, narrow end to said first single mode region and transitioning to a second, wide end; and
   a multimode region coupled to the second, wide end of the first adiabatic region, said multimode region including a rare earth dopant for providing amplification of the optical information signal passing therethrough.

2. An adiabatic optical waveguide amplifier as defined in claim 1, said amplifier further comprising:
   a second adiabatic region formed to support a single mode wave and having a first, wide end and a second, narrow end, said first, wide end coupled to the termination of the multimode region; and
   a second single mode region coupled between the second, narrow end of the second adiabatic region and the optical waveguide output port.

3. An adiabatic optical waveguide amplifier as defined in claim 1 wherein the multimode region is rare earth-doped.

4. An adiabatic optical waveguide amplifier as defined in claim 3 wherein the rare earth dopant comprises erbium.

5. An adiabatic optical waveguide amplifier as defined in claim 1 wherein the multimode region is essentially rectangular.

6. An adiabatic optical waveguide amplifier as defined in claim 1 wherein the multimode region comprises a length L greater than the length of the optical substrate.

7. An adiabatic optical waveguide amplifier as defined in claim 6 wherein the multimode region comprises a serpentine geometry.

8. An adiabatic optical waveguide amplifier as defined in claim 1 wherein the first adiabatic region is doped with a rare earth dopant.

9. An adiabatic optical waveguide amplifier as defined in claim 1 wherein the waveguide amplifier further comprises a second waveguide for supporting pump signal, said second waveguide intersecting the multimode region of said optical waveguide amplifier.

10. An adiabatic optical waveguide amplifier as defined in claim 9 wherein the second waveguide is coupled to a plurality of separate pump sources.

* * * * *